Sept. 27, 1966  K. W. KAMPERT ET AL  3,275,173
LOAD HANDLING VEHICLE

Filed April 16, 1965  2 Sheets-Sheet 1

INVENTORS
KEITH W. KAMPERT
RICHARD F. ZIMMERMAN
BY
ATT'Y.

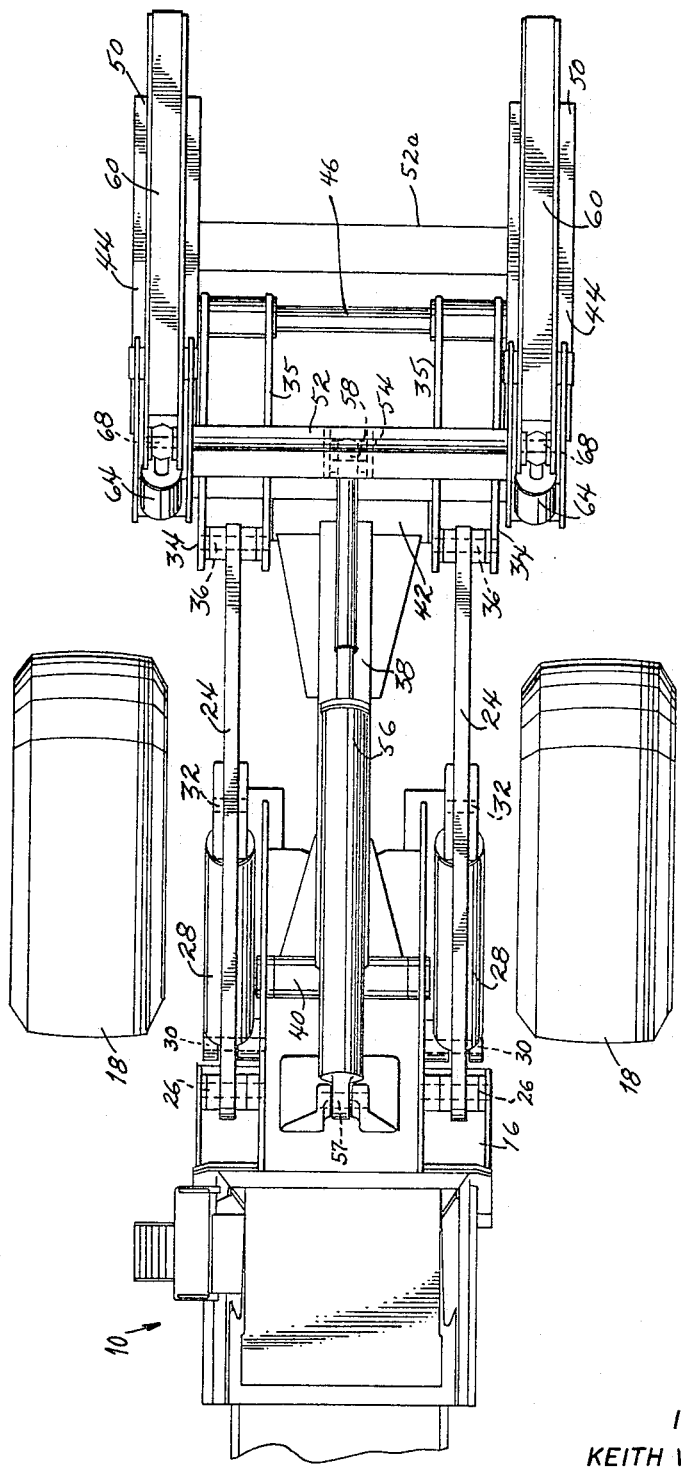

3,275,173
LOAD HANDLING VEHICLE
Keith W. Kampert, Libertyville, and Richard F. Zimmerman, Waukegan, Ill., assignors to International Harvester Company, a corporation of Delaware
Filed Apr. 16, 1965, Ser. No. 448,820
1 Claim. (Cl. 214—767)

This invention relates to load handling vehicles and more particularly relates to load handling vehicles incorporating a grapple attachment with tong members mounted on a floating linkage mechanism.

Loads such as logs or barrels and the like which require a grapple attachment for easy handling often produce stability problems in the vehicle. Thus, grapple mechanisms which clasp the load in devices heretofore used, when raised to the elevated or dumping position, would shift the center of gravity so as to produce instability in the vehicle when traveling over rough terrain. Furthermore, the prior art grapple devices are limited in their flexibility of operation in that the tong members used on such devices do not have the ability to be positioned in any desired attitude for clasping the load; previous grapple devices also have a limited capability to raise heavy loads to an elevated position and to dump these loads at a maximum distance forward from the vehicle.

Accordingly it is an object of this invention to provide a load handling vehicle with a grapple attachment which is capable of clasping a load in any desired position followed by cradling the tong members and the load backwards toward the vehicle to achieve improved stability.

It is another object of this invention to provide a grapple attachment for a load handling vehicle in which a floating linkage mechanism provides vertical movement for a support member which in turn supports a pair of tong members clasping the load, and in which the load is dumped at a maximum vertical height and forward reach.

Still another object of this invention is to provide a grapple attachment for a load handling vehicle in which a floating linkage mechanism connected to a support member tilts the support member backwards during vertical pivoting of the floating linkage mechanism and in which tong members for clasping the load are connected to the support member.

Another object is to provide an improved grapple attachment for a load handling vehicle in which a rigid link absorbs a component of the weight of the load so that the attachment has an increased capability to lift the load to an elevated position.

Other objects and advantages of the present invention will become apparent to those skilled in the art when the following specification is read in conjunction with the accompanying drawings, wherein:

FIGURE 3 is an enlarged top plan view of the load handling vehicle of the present invention.

Figure 2:
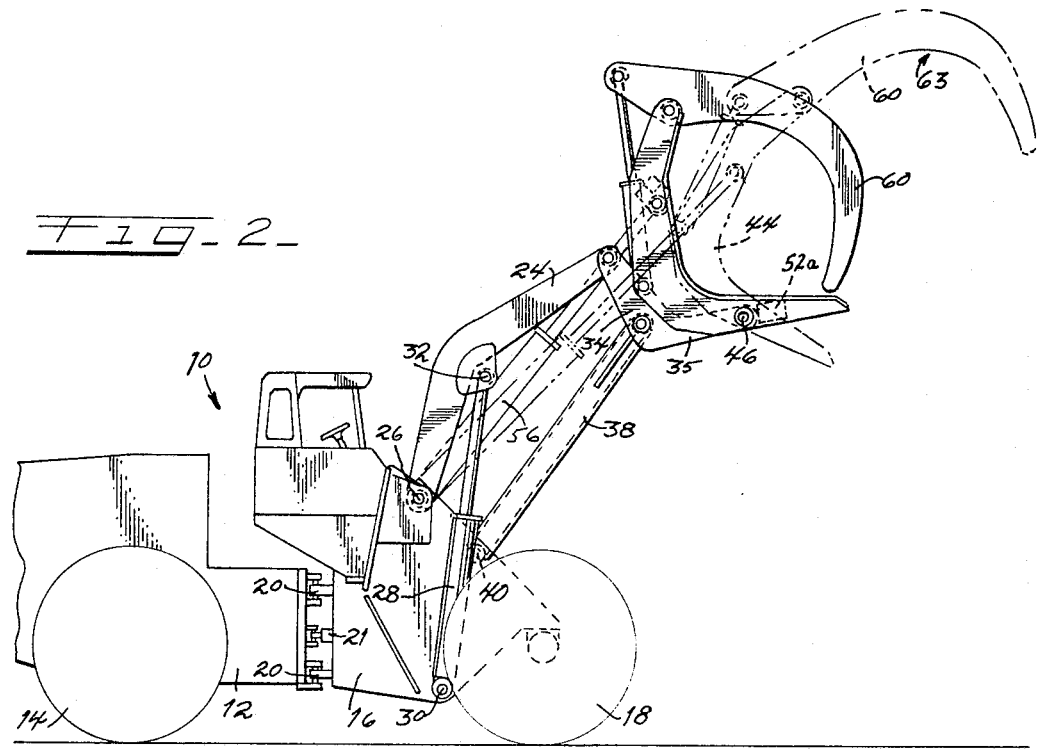
FIGURE 2 is a side elevation view of a load handling vehicle of the present invention in which the floating linkage mechanism is in the elevated position and in which the tong members are shown both in the roll-back and roll-forward positions.

The grapple attachment of the present invention is shown in the drawings as being attached to an articulated vehicle indicated generally at 10. However, it is understood that the grapple attachment of this invention may also be incorporated on other types of load handling vehicles such as rigid-frame rubber-tired vehicles, and also on crawler vehicles. The articulated vehicle 10 comprises a rear frame section 12 supported by wheels 14 and a front frame section 16 supported by wheels 18 and articulated to the rear section 12 about an axis defined by the pivotal connections 20. Steering of the vehicle 10 is accomplished in a well-known manner by operation of hydraulic rams 21 connected between the two frame sections. The grapple attachment is indicated generally at 22 and is mounted at the forward end of the front frame section 16. A pair of boom arms 24 are pivotally attached to the frame section 16 about a transverse horizontal axis defined by a pair of pins 26. A pair of extensible hydraulic rams 28 are each pivotally connected at their head ends to frame section 16 about pins 30 and at their rod ends to boom arms 24 intermediate the ends thereof about pins 32. Selective extension and retraction of rams 28 by appropriate manipulation of conventional hydraulic controls (not shown) will raise and lower the boom arms 24 in a pivotal movement about pins 26. A pair of transversely spaced-apart support members 34 each have an L-shaped configuration and are pivotally connected to the free end of a respective boom arm 24 about pins 36.

A rigid link 38 is pivotally connected at its one end to front frame section 16 about pins 40 and at its other end to a tubular cross-support member 42 rigidly connected between the pair of support members 34. As contemplated by this invention link 38 has a shorter effective length as compared to boom arms 24. This sizing of the boom arms and link will produce a "floating-linkage" mechanism whereby support member 34 will tilt backwards relative to the vehicle during its movement from the lowered to the raised positions. Thus, FIGURE 2 shows the boom arms and support member in the raised position. It is apparent that the support member 34 has tilted or rotated backwards toward the vehicle as compared to the lowered position shown in FIGURE 1.

The free end 35 of each of the support members 34 extends forwardly of the vehicle. A pair of rear tong members 44 are each pivotally connected to the free end 35 of a respective support member 34 about pins 46. The forwardly directed faces 48 of the tong members 44 are reinforced to engage a variety of loads such as logs or barrels. The forward end 50 of the tong members 44 are formed into forwardly projecting points in a well-known manner. A transversely extending cross-support member 52 has a box-shaped cross sectional configuration and is secured between the rear tong members 44 by suitable means such as welding. A paid of spaced-apart brackets 54 extend downwardly from the cross support member 52 intermediate the ends thereof. An extensible hydraulic ram or motor 56 is pivotally connected at its head end to the frame section 16 about pin 57 (FIGURE 3) on an axis coincident with the axis of pins 26, and is pivotally connected at its rod end to a pin 58 secured between the brackets 54. Appropriate manipulation of conventional hydraulic controls (not shown) will extend and retract the hydraulic ram 56 to roll-forward and roll-back the rear tong member 44 relative to support member 34.

Figure 1:
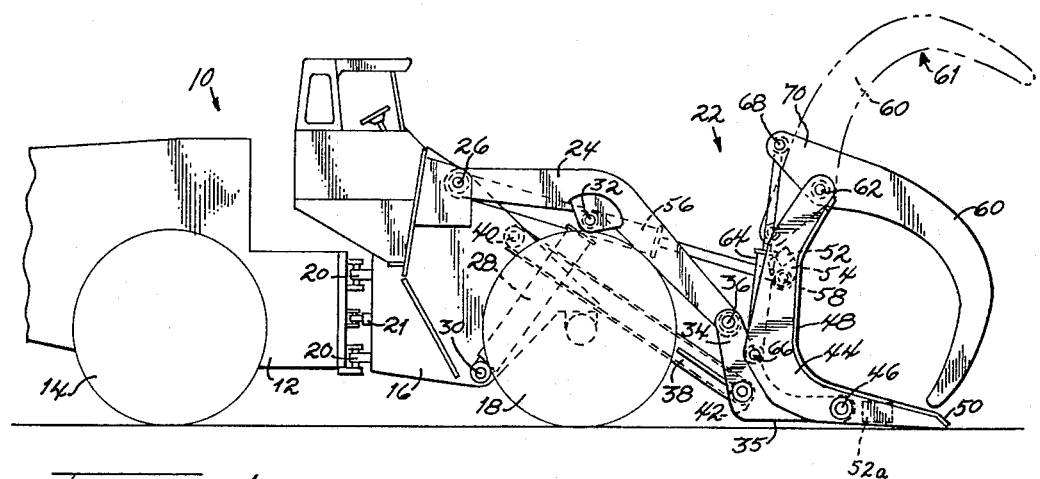
FIGURE 1 is a side elevation view of a load handling vehicle incorporating features of the present invention in which the tong members are shown in both closed and open positions.

A pair of front tong members 60 are each pivotally attached to a respective one of the rear tong members 44 about pin members 62. A pair of extensible hydraulic rams or motors 64 are each pivotally attached at their head ends to a respective one of the rear tong member 44 about pins 66, and are pivotally attached at their rod ends to pins 68 disposed on rearwardly projecting arms 70 integral with front tong members 60. Appropriate extension and retraction of ram 64 will pivot tong member 60 relative to tong member 44 in a scissors action to grip the desired load. In FIGURE 1 the broken-line illustration indicated at 61 represents the fully opened position of the tong member 60. In FIGURE 2 the broken-line illustration indicated at 63 represents the dumping position with the rear tong member 44 rolled forward and with the front tong member 60 fully opened.

The novel linkage arrangement of the present invention affords many advantages over existing grapple attachments. Thus, the floating linkage mechanism will afford an increased dumping height coupled with an increased forward reach or longitudinal distance of the load from the tractor. With the load gripped by the tong members 44 and 60, forward dumping of the load will be effected in a raised position of the boom arms 24 by pivoting the tong members about pins 46 followed by subsequent opening of the front tong member 60. To afford an increased ability to dump onto raised vehicle beds and the like, it is desirable that the pivot axis about pins 46 be positioned as far forward of the vehicle and as high from the ground as is possible. With the floating linkage mechanism of this invention the optimum combination of high dumping height and forward reach is achieved. As shown in FIGURE 2 the boom arms are in their maximum elevated position. In this position the pivot axis about the pins 46 is at the maximum height and forward reach for the mechanism. In conventional attachments where the corresponding pivot axis is mounted on the free end of the boom arms, the height achieved would be greater but the forward reach from the tractor would be much less.

The grapple attachment of the present invention also gives an increased ability to dump the load in the elevated position. The positioning of the pivot axis for the tong members about pins 46 in the elevated position as shown in FIGURE 2 provides an increased moment arm for the ram 56 to act through as the load is dumped forward. Therefore a smaller and less expensive ram 56 may be utilized to achieve the same dumping force as compared to conventional equipment.

As indicated above, the link 38 has a shorter effective length as compared to the boom arms 24. This expedient provides a slight roll-back to the support member 34 as the boom arms are moved to the elevated position. This provides an increased stability to the vehicle in that the combined center of gravity of the load and the tractor is moved between the wheel base of the tractor.

The floating linkage mechanism of the present invention also affords an increased ability for the rams 28 to bring a heavy load to the fully elevated position. This is achieved because the rigid link 38 will absorb an increasingly greater component of the weight of the load as the boom arms are raised. This is desirable since as the boom arms near their maximum elevated position the effective moment arm which rams 28 act through becomes progressively less, and the rams 28 must exert a much larger force to elevate the boom arms 24 through their final arc of travel. It is apparent that with the grapple attachment of the present invention incorporating the rigid link 38 much smaller and less expensive rams 28 may be utilized as compared with conventional equipment to achieve the fully elevated position of the boom arms 24.

It will be understood that various changes in the details and arrangement of parts, which have been described and illustrated in order to explain the nature of the invention, may be made by those skilled in the art within the principal scope of the invention as expressed in the appended claim.

What is claimed is:

A load handling attachment for mounting on a vehicle frame comprising: a boom pivotally mounted at one end to the frame for movement in a generally vertical plane; a support member pivotally mounted on the other end of the boom, the support member having an arm extending forwardly of the other end of the boom; means including a link in parallel relationship to the boom connected between the frame and the support member to move the arm with an upward and forward motion as the boom is elevated; first tong means pivotally connected to the arm; an extensible hydraulic ram pivotally connected at its one end to the frame about an axis substantially coincident with the pivotal mounting of the boom to the frame and at its other end to the first tong means; second tong means pivotally mounted on the first tong means; and motor means to pivot the second tong means relative to the first tong means to grip the load.

References Cited by the Examiner

UNITED STATES PATENTS

| | | | |
|---|---|---|---|
| 2,799,412 | 7/1957 | Pilch | 214—147 |
| 2,997,193 | 8/1961 | Dunham | 214—147 X |
| 3,034,821 | 5/1962 | Hackett et al. | 214—147 X |
| 3,104,771 | 9/1963 | Stilley | 214—140 |

HUGO O. SCHULZ, *Primary Examiner.*